(12) United States Patent
Li (10) Patent No.: US 12,535,884 B2
(45) Date of Patent: Jan. 27, 2026

(54) METHOD, APPARATUS, ELECTRONIC DEVICE AND STORAGE MEDIUM FOR LINE-OF-SIGHT ANGLE ADJUSTMENT

(71) Applicant: Beijing Zitiao Network Technology Co., Ltd., Beijing (CN)

(72) Inventor: Bingchuan Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 98 days.

(21) Appl. No.: 18/569,362

(22) PCT Filed: Aug. 30, 2022

(86) PCT No.: PCT/CN2022/115862
§ 371 (c)(1),
(2) Date: Dec. 12, 2023

(87) PCT Pub. No.: WO2023/030321
PCT Pub. Date: Mar. 9, 2023

(65) Prior Publication Data
US 2024/0281060 A1     Aug. 22, 2024

(30) Foreign Application Priority Data
Aug. 31, 2021   (CN) .......................... 202111013443.0

(51) Int. Cl.
*G06F 1/16*   (2006.01)
*G06F 3/01*   (2006.01)
*G06T 7/73*   (2017.01)

(52) U.S. Cl.
CPC ................ *G06F 3/013* (2013.01); *G06T 7/73* (2017.01); *G06T 2207/20081* (2013.01); *G06T 2207/30201* (2013.01)

(58) Field of Classification Search
CPC ..................... G09G 3/013; G06T 2207/03201
See application file for complete search history.

(56) References Cited

U.S. PATENT DOCUMENTS

| 2002/0101505 | A1* | 8/2002 | Gutta ....................... H04N 7/15 348/E7.083 |
| 2012/0120264 | A1 | 5/2012 | Lee et al. |

(Continued)

FOREIGN PATENT DOCUMENTS

| CN | 104699124 A | 6/2015 |
| CN | 108829893 A | 11/2018 |

(Continued)

OTHER PUBLICATIONS

International Search Report (with English translation) and Written Opinion issued in PCT/CN2022/115862, dated Nov. 25, 2022, 9 pages provided.

(Continued)

*Primary Examiner* — Sanghyuk Park
(74) *Attorney, Agent, or Firm* — Astute IP Law Group (57) ABSTRACT

The present disclosure discloses a method, apparatus, electronic device, and storage medium for line-of-sight angle adjustment. The line-of-sight angle adjustment method comprises: collecting a facial image to be processed of a target user, processing the facial image to be processed based on a target line-of-sight angle adjustment model to obtain a target facial image corresponding to the facial image to be processed, the target line-of-sight angle adjustment model is used to adjust the line-of-sight angle of a user in the facial image to the target angle; and displaying the target facial image to at least one client.

18 Claims, 4 Drawing Sheets

(56) References Cited

U.S. PATENT DOCUMENTS

2013/0346588 A1   12/2013  Zhang et al.
2022/0224860 A1*  7/2022  Xu ......................... H04N 7/147
2023/0162332 A1*  5/2023  Yang ....................... G06T 17/00
                                                               348/241

FOREIGN PATENT DOCUMENTS

| CN | 110598765 A | 12/2019 |
|---|---|---|
| CN | 111353071 A | 6/2020 |
| CN | 111353336 A | 6/2020 |
| CN | 112199526 A | 1/2021 |
| CN | 112733794 A | 4/2021 |
| CN | 112733795 A | 4/2021 |
| CN | 113222857 A | 8/2021 |
| CN | 113641247 A | 11/2021 |

OTHER PUBLICATIONS

Office Action issued in corresponding Chinese Application No. 202111013443.0, dated Jan. 11, 2023, with machine translation.
Liu et al., "Introduction to Artificial Intelligence", Beijing University of Posts and Telecommunications Press, 2020, 5 pages (2 pages of English Translation and 3 pages of Original Document).
Office Action received for Chinese Patent Application No. 202111013443.0, mailed on Apr. 12, 2023, 20 pages (8 pages of English Translation and 12 pages of Original Document).
International Search Report and Written Opinion for International Application No. PCT/CN2021/117199, mailed on Dec. 17, 2021, 14 pages.

* cited by examiner

METHOD, APPARATUS, ELECTRONIC DEVICE AND STORAGE MEDIUM FOR LINE-OF-SIGHT ANGLE ADJUSTMENT

The present application claims priority to the Chinese patent application No. 202111013443.0 filed with the Chinese Patent Office on Aug. 31, 2021, the entirety of which is incorporated herein by reference.

FIELD

The present disclosure relates to the field of computer technology, for example, to a method, apparatus, electronic device, and storage medium for line-of-sight angle adjustment.

BACKGROUND

With the development of intelligent terminal and internet technology, more and more anchor users interact with other users through intelligent terminal.

In order to improve the interaction effect, the text to be broadcast can be displayed through a teleprompter, so that the anchor user can interact with other users based on the content on the teleprompter.

However, during the process of using the teleprompter by the anchor user, line-of-sight deviation and non-focus is easily occur, which greatly reduces the interaction effect.

SUMMARY

The present disclosure provides a line-of-sight angle adjustment method, apparatus, electronic device and storage medium, so that when it is determined according to the collected image that a line-of-sight angle of a user is inconsistent with a target line-of-sight angle, the line-of-sight angle is adjusted to the target line-of-sight angle to obtain a target facial image, and the target facial image is sent to at least one client, thereby obtaining a technical effect of improving interaction efficiency.

The present disclosure provides a line-of-sight angle adjustment method, which comprises: collecting a facial image to be processed of a target user, processing the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and displaying the target facial image to at least one client.

The present disclosure also provides a line-of-sight angle adjustment apparatus, which comprises:
 an image collecting module configured to collect a facial image to be processed of a target user,
 an image processing module configured to process the facial image to be processed based on a target line-of-sight angle adjustment model to obtain a target facial image corresponding to the facial image to be processed; wherein the target line-of-sight angle adjustment model is configured to adjust the line-of-sight angle of a user in the facial image to a target angle; and
 an image display module configured to display the target facial image to at least one client.

The present disclosure also provides an electronic device, the electronic device comprising:
 one or more processors;
 a storage means configured to store one or more programs;
 when the one or more programs are executed by the one or more processors, the one or more processors implement the line-of-sight angle adjustment method as described above.

The present disclosure also provides a storage medium comprising computer-executable instructions, the computer-executable instructions perform the line-of-sight angle adjustment method described above when being executed by a computer processor.

The present disclosure also provides a computer program product comprising a computer program carried on a non-transitory computer-readable medium, the computer program comprising program code for performing the above-described line-of-sight angle adjustment method.

DETAILED DESCRIPTION

The following will describe the embodiments of the present disclosure with reference to the accompanying drawings. Although some embodiments of the present disclosure are shown in the drawings, the present disclosure can be implemented in various forms and should not be construed as limited to the embodiments set forth herein. The drawings and embodiments of the present disclosure are for illustrative purposes only.

Multiple steps recorded in the method implementation of the present application can be performed in different orders and/or in parallel. In addition, the method implementation can comprise additional steps and/or omit the steps as shown. The scope of the present disclosure is not limited in this regard.

The term "comprising" and its variations as used herein are non-exclusive inclusion, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different apparatuses, modules, or units, but are not used to limit the order or interdependence of the functions performed by these apparatuses, modules, or units.

The modifications of "one" and "a/the plurality of" mentioned in this disclosure are illustrative but not limiting.

Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

Embodiment 1

Figure 1:
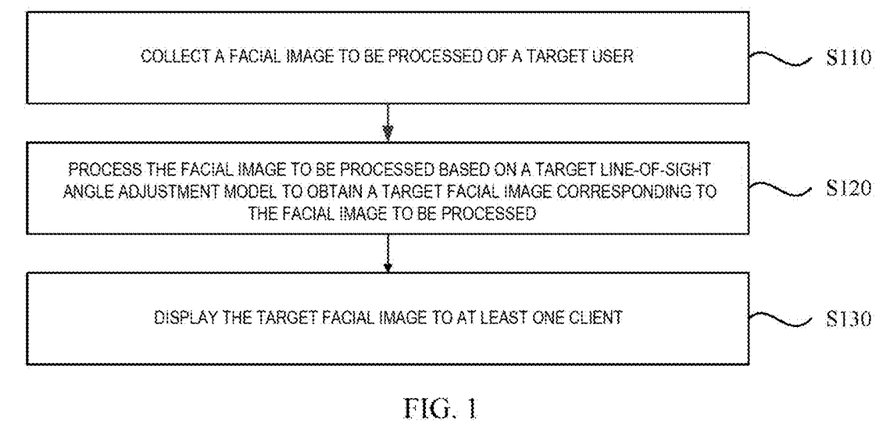
FIG. 1 is a flowchart of a line-of-sight angle adjustment method provided in embodiment 1 of the present disclosure.

FIG. 1 is a flowchart of a line-of-sight angle adjustment method provided in embodiment 1 of the present disclosure. The embodiment of the present disclosure can be applied to real-time interactive application scenarios supported by the Internet as well as non-real-time interactive scenarios to focus the line-of-sight of a target user to a special angle. The method can be performed by a line-of-sight angle adjustment apparatus. The apparatus can be implemented in the form of software and/or hardware, for example, by an electronic device, which can be a mobile terminal, a personal computer (PC), or a server. Real-time interactive application scenarios may usually be implemented by the combination of a client and a server. The method provided in this embodiment can be executed by a client, a server, or the combination thereof.

Before introducing the present technical solution, the application scenario can be an illustratively described first. The method provided in the embodiment of the present disclosure can be integrated into any application program or mobile terminal. If the method provided in the embodiment of the present disclosure is integrated into an application program, when the application program starts, the integrated line-of-sight angle adjustment method can be automatically loaded, and when obtaining information of the facial image of the user, the facial image can be processed based on the line-of-sight angle adjustment method. If the method provided in the embodiment of the present disclosure is integrated on a terminal device, a line-of-sight focusing method can be used as a method running in the background. When the information of the facial image is collected, the facial image can be processed based on the line-of-sight angle adjustment method. That is to say, as long as the information of the facial image is collected, line-of-sight focusing can be performed by using the technical solution of the present disclosure.

In the application, whether to call the line-of-sight angle adjustment method may also be set by users according to actual needs. Whether to call the line-of-sight angle adjustment method may be manually set by users. If a user sets to call the line-of-sight angle adjustment method manually, the line-of-sight in the facial image may be focused to the target angle when the facial image is collected. If the user does not set to call the line-of-sight angle adjustment method manually, no processing needs to be performed on the line-of-sight in the facial image when the facial image is collected.

The technical solution provided in the embodiments of the present disclosure may be applied in real-time interactive scenarios, such as LIVE, video conferencing, etc. In the LIVE scenario, the anchor user may interact with other users through a terminal device. During the interaction process, when a multimedia data stream of the target user is sent to other clients, the line-of-sight angle in the facial image to be processed corresponding to the target user may be adjusted to the target line-of-sight angle to obtain the target facial image, so that other users can view through the client the target user whose line-of-sight angle is adjusted to the target angle. For example, the line-of-sight angle of the anchor user can be adjusted according to this technical solution, so that other users may view the target user whose line-of-sight angle is always at the target angle. If applied in non-real-time interactive scenarios, for example, when taking pictures for the user by a camera, the line-of-sight angle of the user being photographed can be adjusted to the target angle according to this technical solution.

As shown in FIG. 1, the method comprises:

S110, collecting a facial image to be processed of a target user.

The line-of-sight angle adjustment method can be integrated inside the terminal, or the line-of-sight angle adjustment method can be integrated to an application installed on the terminal. When a user takes a facial image based on a camera apparatus on the terminal, a user matching the facial image is designated as the target user.

When detecting that a user triggers a target application A and triggers the photographing control, the camera apparatus on the terminal can be used to take the user's facial image, and the user corresponding to the facial image can be considered as the target user. Correspondingly, the facial image obtained by photographing is used as the facial image to be processed.

For example, after a user B triggers target application A to enter a main page, the photographing control on the main page may be triggered. At this time, the camera apparatus can be used, so as to obtain a face image comprising user B by photographing through the camera apparatus, and this face image is used as the facial image to be processed. Correspondingly, user B is the target user.

In this embodiment, the collecting a facial image to be processed of a target user comprises: when at least one user interacts based on a real-time interactive interface, collecting the facial image to be processed of the target user among the at least one user.

A real-time interactive interface is any interactive interface in real-time interactive application scenarios. Real-time interactive scenarios can be implemented through the Internet and computer means, such as interactive applications implemented through native programs or web programs. Real-time interactive application scenarios can be LIVE scenarios, video conferencing scenarios, voice broadcast scenarios, and recorded video scenarios. LIVE scenarios can comprise sales through LIVE in applications, as well as live broadcasting scenarios based on LIVE platforms; voice broadcast scenarios can be scenarios where anchors in TV stations broadcast corresponding content, and multimedia data streams broadcast by anchors can be sent to at least one client based on cameras. Considering the need to save resources, the facial image to be processed of the target user can be periodically collected. In order to improve the processing accuracy of facial image, real-time collection of the facial image to be processed of the target user can also be selected.

When interacting based on a real-time interactive interface, the facial image to be processed of the target user can be collected periodically or in real time, and then the facial image to be processed can be processed to obtain a target facial image corresponding to the facial image to be processed.

In an example, real-time interactive interfaces are generated based on scenarios of online video broadcasting. The video broadcasting scenario comprises an anchor and a viewing user who watches broadcast of the anchor. When the anchor broadcasts based on pre-set broadcast text, the camera apparatus may collect the anchor's facial image in real time or every few seconds, such as every 5 seconds, to obtain the facial image to be processed.

There may be one or more anchor users in real-time interactive scenarios. For example, in a LIVE room, there are two anchors, and the two anchors are in a cooperative relationship. In this case, one anchor mainly faces the viewing users, and the other anchor mainly plays a cooperative role. Therefore, the line-of-sight of the anchor that plays a cooperative role may not be what the user is concerned about. In this case, the line-of-sight angle of the anchor user facing the viewing user can be mainly adjusted. For example, before live broadcasting of the anchor user, a main anchor user and a slave anchor user can be pre-set. When obtaining facial images comprising two anchor users, only the line-of-sight angle of the main anchor user is adjusted; or, when the main anchor user is not comprised in the video screen, the line-of-sight angle adjustment may not need to be performed on the collected facial image. In the case that there are multiple anchors in the same LIVE room, all anchors may also be considered as target users. At this time, as long as the facial image to be processed of the target user(s) is collected, the line-of-sight angle can be adjusted and processed.

In this embodiment, the collecting the facial image to be processed of the target user among the at least one user when the at least one user interacts based on the real-time interactive interface comprises: determining a current speaking user and determining the speaking user as the target user when at least one user interacts based on the real-time interactive interface; and collecting the facial image to be processed of the target user based on a camera module.

In application scenarios, such as video conferencing scenarios, each participating user can be considered as a target user, in order to improve the fun and viewability of video LIVE, a plurality of anchors may have a video chat, at this time, the plurality of video chatting users are target users. In this case, this technical solution can be used to collect facial images of each of the target users, then adjust the line-of-sight angles in the facial images, and then send to at least one client the focused target facial images in form of multimedia data streams, so that the line-of-sight of the target users viewed by the viewing user is adjusted through line-of-sight angle adjustment.

In a scenario where the plurality of interactive users are comprised in the real-time interactive interface, the speaking user can be determined in real time and the speaking user may be considered as the target user. When it is detected that a user corresponding to the current device is the target user, a facial image corresponding to the target user collected by a camera apparatus can be used as the facial image to be processed.

Based on the above technical solution, the collecting a facial image to be processed of a target user may comprise: when detecting that a predetermined event is triggered, collecting the facial image to be processed of the target user based on a camera module.

The predetermined event may comprise triggering a wake-up word, triggering a control for adjusting line-of-sight, or detecting the presence of a user in front of the display screen, all of which can be used to determine that a predetermined event is triggered.

In practical applications, when detecting that one or more of the above predetermined events are triggered, it can be considered that the target user has initiated a line-of-sight angle adjustment model, and the facial image collected by the camera apparatus can be used as the facial image to be processed.

S120, processing the facial image to be processed based on a target line-of-sight angle adjustment model to obtain a target facial image corresponding to the facial image to be processed.

When photographing a facial image of a user based on a camera apparatus, the facial image usually comprises facial features of the user, and in this embodiment, the line-of-sight feature of the user is more concerned. In practical applications, when the user is directly facing a display screen of the terminal, there will be a certain difference in the line-of-sight angle of the facial image photographed by the camera apparatus arranged on the terminal, thus the line-of-sight angle of the user in the facial image photographed by the camera apparatus is non-frontal, resulting in poor interactive user experience easily. Alternatively, in a voice broadcast scenario, the user focuses on the content in the teleprompter for broadcasting, and when the user looks at the content of the teleprompter, there will be a deviation in the line-of-sight angle, resulting in poor user experience in watching the broadcast.

The target line-of-sight angle adjustment model is a pre-trained module and it is configured to adjust the line-of-sight angle of the user in a facial image to the target angle. The target facial image is an image obtained by adjusting the line-of-sight angle in the facial image to be processed to the target angle through the target line-of-sight angle adjustment model. That is, the line-of-sight angle of the user in the target facial image is adjusted to a pre-set target angle. The target angle can be an angle at which the line-of-sight of the user is perpendicular to the display screen, that is, the angle at which the line-of-sight of the user is facing straightly the display screen. The target angle can be any pre-set angle. In order to improve interaction efficiency between the anchor user and other users, the target angle can be an angle at which the line-of-sight of the target user and the camera apparatus are on a horizontal line.

As long as the facial image to be processed is collected, the facial image to be processed can be input into the target line-of-sight angle adjustment model for adjusting the line-of-sight angle, so as to adjust the line-of-sight angle in the facial image to be processed to the target angle, that is, adjusting non-frontal line-of-sight angle or the frontal line-of-sight angle to the target angle.

Generally, the line-of-sight angle of the user in the facial image to be processed may be consistent with the target angle, or it may be inconsistent with the target angle. In order to save processing resources, it is possible to determine in advance whether the line-of-sight angle in the facial image to be processed is consistent with the target angle after obtaining the facial image to be processed.

In one embodiment, based on the feature detection module, it is determined whether the line-of-sight feature in the facial image to be processed matches a predetermined line-of-sight feature; if the line-of-sight feature in the facial image to be processed does not match the predetermined line-of-sight feature, the facial image to be processed is processed based on the target line-of-sight angle adjustment model to obtain the target facial image.

The feature detection module is configured to detect the line-of-sight feature of the user, and it is mainly configured to determine whether the line-of-sight angle of the user is consistent with the target angle. The predetermined line-of-sight feature is a feature that matches the target angle. The predetermined line-of-sight feature may be a feature such as eyelids and pupils, for example whether the pupil is in the center of the eye, etc.

After obtaining the facial image to be processed, the facial image to be processed can be processed based on the feature detection module, and whether the line-of-sight feature in the facial image to be processed matches the predetermined line-of-sight feature is determined. If the line-of-sight feature in the facial image to be processed is inconsistent with the predetermined line-of-sight feature, it indicates that the line-of-sight angle of the target user is inconsistent with the target angle. At this time, the facial image to be processed can be processed based on the target line-of-sight angle adjustment module.

The target line-of-sight angle adjustment model is a model for adjusting the line-of-sight angle of the user in the facial image to be processed to the target angle. Therefore, the image based on output of the target line-of-sight angle adjustment model is a target facial image having a line-of-sight angle consistent with the target angle. At this time, the line-of-sight feature of the user in the target facial image is different from the line-of-sight feature of the user in the facial image to be processed, and other facial image features are exactly the same.

The processing the facial image to be processed based on the target line-of-sight angle adjustment model to obtain the target facial image comprises: inputting the facial image to be processed into the target line-of-sight angle adjustment model to obtain the target facial image; wherein the line-of-sight angle in the target facial image is different from the line-of-sight angle in the image to be processed.

S130, displaying the target facial image to at least one client.

The number of the at least one client may be one or more than one. The client may be a client to which the target user belongs or a client associated with the target user. For example, the application scenario is a LIVE scenario, the facial image to be processed is a facial image of the anchor user, and the target facial image may be the image obtained by adjusting the line-of-sight angle in the facial image to be processed to the target line-of-sight angle. The client may be a client of each viewing user watching the LIVE. After determining the target facial image corresponding to the anchor, the target facial image can be sent to each viewing user who watching the LIVE in the form of a data stream. At the same time, the target facial image may also be presented on a target client to which the target user belongs.

The displaying the target facial image to at least one client comprises sending a multimedia data stream corresponding to the target facial image to the at least one client associated with the target user for display.

After converting an image to be processed of the target user into a target facial image, the multimedia data stream corresponding to the target facial image is sent to clients of other associated users, so that other users can watch the target user in a straight line-of-sight, thereby improving the interaction effect with the target user.

Figure 2:
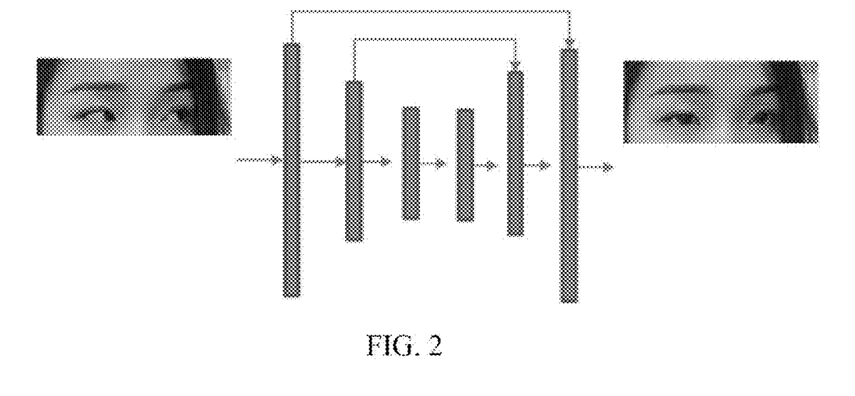
FIG. 2 is a schematic diagram of results of the line-of-sight angle adjustment provided in embodiment 1 of the present disclosure.

In order to understand the technical effect achieved by this technical solution, the schematic diagram shown in FIG. 2 may be referred to. When the line-of-sight angle of the user in the detected facial image to be processed is inconsistent with the target line-of-sight angle, that is, the facial image to be processed is a non-frontal image, then the facial image to be processed can be input into a pre-trained target line-of-sight angle adjustment model to obtain the frontal image shown in FIG. 2. The line-of-sight angle in the frontal image is consistent with the target line-of-sight angle. The data stream corresponding to the frontal image is sent to the client watching LIVE of the target user, at the same time, it is also displayed on the target users own client.

According to the technical solution of the embodiment of the present disclosure, when the facial image to be processed of the target user is collected, the facial image to be processed is processed based on the pre-trained target line-of-sight angle adjustment model, the line-of-sight of the user in the facial image to be processed is focused to the target line-of-sight angle and the target facial image with line-of-sight angle focused to the target line-of-sight angle is displayed to other clients, thereby solving the problem in the art that the line-of-sight is shifted or the line-of-sight is not focused when performing voice broadcasting, resulting in poor interaction effect, and realizing the technical effect that when the target user interacts with other users through the terminal, the line-of-sight of the user can be automatically focused to the target line-of-sight angle, thereby improving the interaction efficiency between the target user and other interactive users.

Embodiment 2

Figure 3:
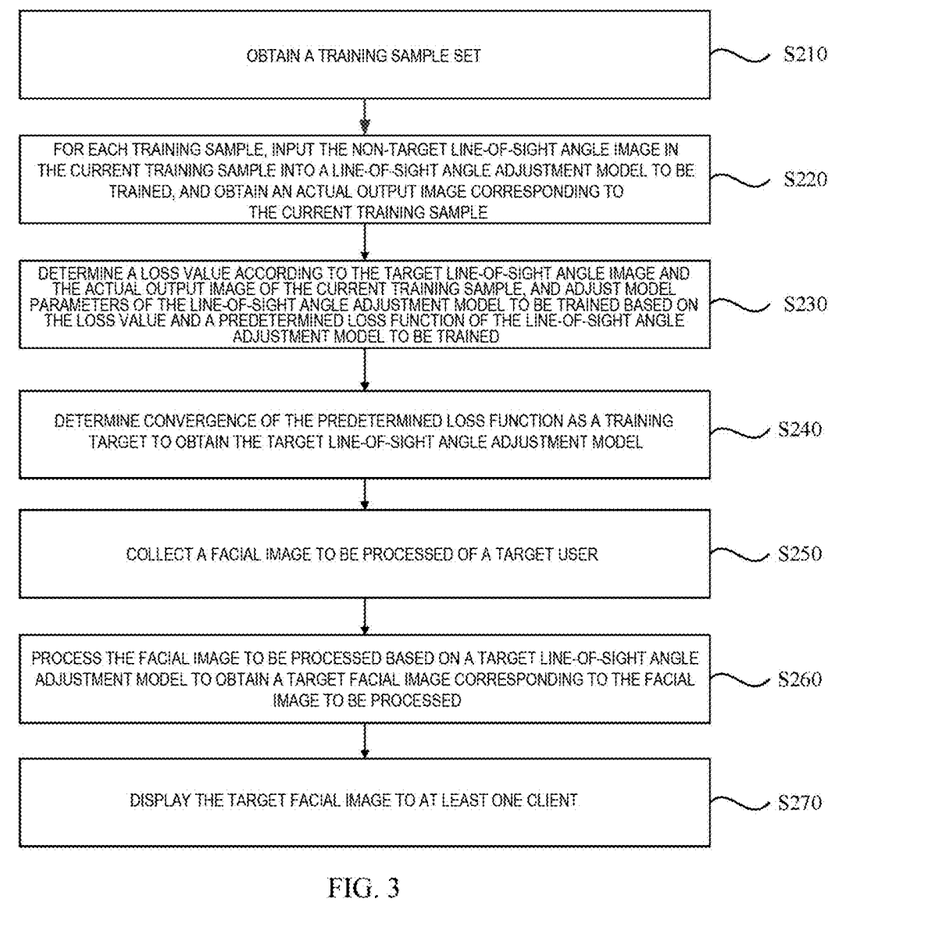
FIG. 3 is a flowchart of a line-of-sight angle adjustment method provided in embodiment 2 of the present disclosure.

FIG. 3 is a flowchart of a line-of-sight angle adjustment method provided in embodiment 2 of the present disclosure. Based on the above embodiments, the target line-of-sight angle adjustment model can be trained before processing the facial image to be processed based on the target line-of-sight angle adjustment model. The description on the same or corresponding technical terms as the above embodiments are not repeated here.

As shown in FIG. 3, the method comprises:

S210, obtaining a training sample set.

Before obtaining the target line-of-sight angle adjustment model by training, it is necessary to obtain training samples to performing training based on the training samples. In order to improve the accuracy of the model, it is recommended to obtain as many and rich training samples as possible.

The set of training sample comprises a plurality of training samples, each training sample comprises a target line-of-sight angle image and a non-target line-of-sight angle image, and the training samples are determined based on a pre-trained target sample generation model. The line-of-sight angle of the user in the target line-of-sight angle image is consistent with a predetermined line-of-sight angle. The non-target line-of-sight angle image is a facial image where the line-of-sight of the user is inconsistent with a target line-of-sight angle. The target sample generation model can be understood as a model for generating training samples.

The target sample generation model can be obtained first by training. The target sample generation model comprises a positive sample generation sub-model and a negative sample generation sub-model. The positive sample generation sub-model is configured to generate the target line-of-sight angle image in the training sample. The line-of-sight angle of the user in the target line-of-sight angle image is consistent with the target line-of-sight angle. Correspondingly, the negative sample generation sub-model is configured to generate the non-target line-of-sight angle image in the training sample, and the line-of-sight angle of the user in the non-target line-of-sight angle image is inconsistent with the target line-of-sight angle.

S220, for each training sample, inputting the non-target line-of-sight angle image in the current training sample into a line-of-sight angle adjustment model to be trained, and obtaining an actual output image corresponding to the current training sample.

The line-of-sight angle adjustment model to be trained can be trained according to each training sample in the training sample set to obtain the target line-of-sight angle adjustment model. Each non-target line-of-sight angle image in the training samples can be used as the input of the line-of-sight angle adjustment model to be trained, and the target line-of-sight angle image corresponding to the non-target line-of-sight angle image can be compared with the output of the line-of-sight angle adjustment model to be trained to adjust the model parameters in the line-of-sight angle adjustment model to be trained. When it is detected that the loss function in the line-of-sight angle adjustment model to be trained converges, it is determined that the target line-of-sight angle adjustment model is obtained by training.

S230, determining a loss value according to the target line-of-sight angle image and the actual output image of the current training sample, and adjusting model parameters of the line-of-sight angle adjustment model to be trained based on the loss value and a predetermined loss function of the line-of-sight angle adjustment model to be trained.

S240, determining convergence of the predetermined loss function of the line-of-sight angle adjustment model to be trained as a training target to obtain the target line-of-sight angle adjustment model.

S250, collecting a facial image to be processed of a target user.

S260, processing the facial image to be processed based on a target line-of-sight angle adjustment model to obtain a target facial image corresponding to the facial image to be processed.

The target line-of-sight angle adjustment model is configured to adjust the line-of-sight angle of a user in a facial image to a target angle.

S270, displaying the target facial image to at least one client.

If in a real-time interactive scenario, each collected facial image to be processed can be processed, and the obtained target facial image can be sent to other clients in the form of multimedia data streams. Thus, on one hand, the photographed video is more flexible and interactive, and on the other hand, each viewing user can see an image with a line-of-sight always being focused on the target line-of-sight, which improves the user's viewing experience.

In the technical solution of the embodiment of the present disclosure, before processing the facial image to be processed based on the target line-of-sight angle adjustment model, the target line-of-sight angle adjustment model can be obtained by training, so that the facial image to be processed collected by the camera apparatus can be processed based on the target line-of-sight angle adjustment model to obtain the target facial image with focused line-of-sight. The target facial image is sent to at least one client, so that each user can view the image of the target user with focused line-of-sight, and thus obtain a more interactive video stream.

Embodiment 3

Figure 4:
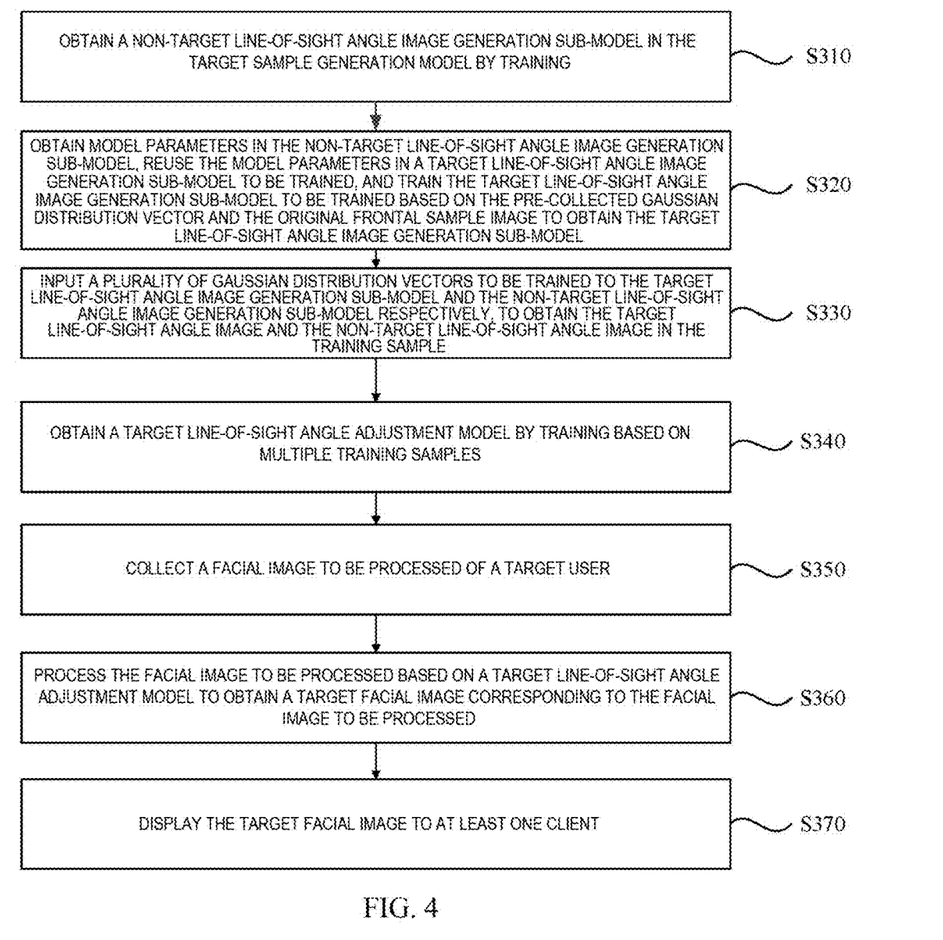
FIG. 4 is a flowchart of a line-of-sight angle adjustment method provided in the embodiment 3 of the present disclosure.

FIG. 4 is a flowchart of a line-of-sight angle adjustment method provided in Embodiment 3 of the present disclosure. Based on the above embodiments, before obtaining the target line-of-sight angle adjustment model by training, the corresponding training samples may be generated based on the target sample generation model. Correspondingly, before obtaining the training samples, the target sample generation model can be obtained by training first. The description on the same or corresponding technical terms as the above embodiments will not be repeated here.

As shown in FIG. 4, the method comprises:

S310, obtaining a non-target line-of-sight angle image generation sub-model in the target sample generation model by training.

A pre-collected Gaussian distribution vector and an original non-frontal sample image are input to a non-target line-of-sight angle image generation sub-model to be trained to obtain an error value; based on the error value and a loss function in the non-target line-of-sight angle image generation sub-model to be trained, model parameters in the non-target line-of-sight angle image generation sub-model to be trained are corrected; the convergence of the loss function is determined as a training target to obtain the non-target line-of-sight angle image generation sub-model, so as to generate the non-target line-of-sight angle image in the training sample based on the non-target line-of-sight angle image generation sub-model.

In the present embodiment, the inputting a pre-collected Gaussian distribution vector and an original non-frontal sample image into a non-target line-of-sight angle image generation sub-model to be trained to obtain an error value, comprising:

processing the Gaussian distribution vector based on a generator in the non-target line-of-sight angle image generation sub-model to be trained to obtain an image to be compared; and processing the original non-frontal sample image and the image to be compared based on a discriminator in the non-target line-of-sight angle image generation sub-model to be trained to obtain the error value.

The Gaussian distribution vector can be random sampling noise. A facial image of a user can be collected when the user is not straightly facing, to obtain an original non-frontal sample image. The model parameters in the non-target line-of-sight angle image generation sub-model to be trained are default parameter values. The Gaussian distribution vector and the original non-frontal sample image can be used as inputs to the non-target line-of-sight angle image generation sub-model to obtain the actual output result, that is, the actual output image. According to the actual output image and the original non-frontal sample image, the error value can be obtained. Based on the error value and the predetermined loss function in the non-frontal target line-of-sight angle image generation sub-model, the model parameters in the sub-model can be corrected. The convergence of the loss function may be determined as the training target to obtain the non-target line-of-sight angle image generation sub-model.

When training a plurality of models disclosed in this technical solution, adversarial training can be used. According to adversarial training, the non-target line-of-sight angle image generation sub-model may comprise a generator and a discriminator. The generator is configured to process the Gaussian distribution vector to generate a corresponding image. The discriminator is configured to determine similarity between the generated image and the original image, so as to adjust model parameters in the generator and discriminator according to the error until training of the non-target line-of-sight angle image generation sub-model is completed.

The generator in the non-target line-of-sight angle image generation sub-model processes the Gaussian distribution vector to obtain an image to be compared corresponding to the Gaussian distribution vector. At the same time, the image to be compared and the original non-frontal sample image may be input to the discriminator, and the discriminator may perform discriminant processing on the two images to obtain output results. The model parameters in the generator and discriminator can be corrected according to the output results. When it is detected that the loss function of the model converges, the obtained model can be used as a non-target line-of-sight angle image generation sub-model.

S320, obtaining model parameters in the non-target line-of-sight angle image generation sub-model, and reusing the model parameters in a target line-of-sight angle image generation sub-model to be trained; and training the target line-of-sight angle image generation sub-model to be trained based on the pre-collected Gaussian distribution vector and the original frontal sample image to obtain the target line-of-sight angle image generation sub-model.

After obtaining the non-target line-of-sight angle generation sub-model, the target line-of-sight angle generation sub-model can be obtained by training. For example, model parameters in the non-target line-of-sight angle image generation sub-model are obtained, and then the model parameters are reused in a target line-of-sight angle image generation sub-model to be trained; and the target line-of-sight angle image generation sub-model to be trained is trained based on the pre-collected Gaussian distribution vector and the original frontal sample image to obtain the target line-of-sight angle image generation sub-model.

At this time, the target line-of-sight angle image generation sub-model to be trained is also trained based on adversarial training, that is, the sub-model also comprises a generator and discriminator. The effects of the generator and discriminator are the same as those used in the sub-model as mentioned above. The method for training the target line-of-sight angle image generation sub-model is the same as that for obtaining the non-target line-of-sight angle image generation sub-model, which will not be repeated here.

In order to improve the convenience of training the target line-of-sight angle image generation sub-model, after completing training of the non-target line-of-sight angle image generation sub-model, it is possible to reuse the model parameters of the non-target line-of-sight angle image generation sub-model, that is using these model parameters as initial model parameters for training the target line-of-sight angle image generation sub-model.

S330, inputting a plurality of Gaussian distribution vectors to be trained to the target line-of-sight angle image generation sub-model and the non-target line-of-sight angle image generation sub-model respectively, to obtain the target line-of-sight angle image and the non-target line-of-sight angle image in the training sample.

The target line-of-sight angle image generation sub-model and the non-target line-of-sight angle image generation sub-model as a whole may be considered as the target sample generation model. Alternatively, the target line-of-sight angle image generation sub-model and the non-target line-of-sight angle image generation sub-model can be encapsulated together, so that two images can be output according to an input, and the line-of-sight angles of the user in the two images are different.

A general problem in training models is that a large number of samples need to be collected, and the sample collection is difficult to some extent. For example, in this embodiment, a large number of images of users under the target line-of-sight and non-target line-of-sight are collected, and thus sample collection is difficult and the standards are inconsistent. Based on this technical solution, random sampling noise can be directly processed to obtain images of the same user under different line-of-sight angles, thereby obtaining corresponding samples, which improves the convenience and universality in determining samples, and thus improves the convenience of training models.

Based on the target line-of-sight angle image generation sub-model and non-target line-of-sight angle image generation sub-model in the target sample generation model, a plurality of Gaussian distribution vectors are processed sequentially to obtain target line-of-sight angle images and non-target line-of-sight angle images in the training samples.

S340, obtaining a target line-of-sight angle adjustment model by training based on the plurality of training samples.

S350, collecting a facial image to be processed of a target user.

S360, processing the facial image to be processed based on a target line-of-sight angle adjustment model to obtain a target facial image corresponding to the facial image to be processed.

The target line-of-sight angle adjustment model is configured to adjust the line-of-sight angle of a user in a facial image to a target angle.

S370, displaying the target facial image to at least one client.

In the technical solution of the embodiment of the present disclosure, the random sampling noise can be processed by the target sample generation model obtained through pre-training to obtain a large number of training samples for training the target line-of-sight angle adjustment model, and thus the technical effect of improving the convenience and uniformity in obtaining training samples is obtained.

Embodiment 4

Figure 5:
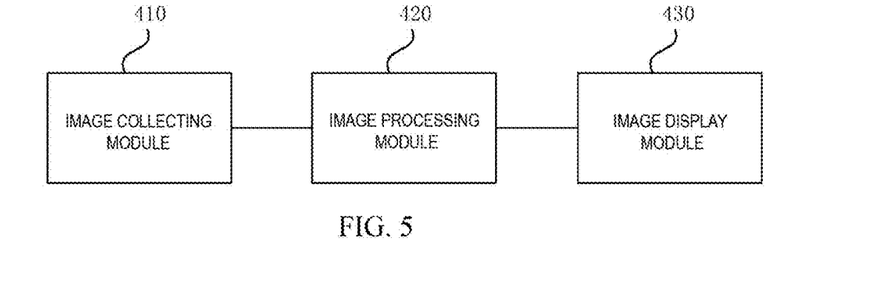
FIG. 5 is a structural schematic diagram illustrating a line-of-sight angle adjustment apparatus provided in embodiment 4 of the present disclosure.

FIG. 5 is a structural schematic diagram of a line-of-sight angle adjustment apparatus provided in the embodiment 4 of the present disclosure. The apparatus comprises: an image collecting module 410, an image processing module 420, and an image display module 430. The image collecting module 410 is configured to collect a facial image to be processed of a target user, the image processing module 420 is configured to process the facial image to be processed based on a target line-of-sight angle adjustment model to obtain a target facial image corresponding to the facial image to be processed, where the target line-of-sight angle adjustment model is configured to adjust the line-of-sight angle of a user in a facial image to a target angle; and the image display module 430 is configured to display the target facial image to at least one client.

Based on the above technical solution, the image collecting module 410 is configured to collect the facial image to be processed of the target user among the at least one user when at least one user interacts based on a real-time interactive interface, or, collect the facial image to be processed of the target user based on a camera module when detecting that a predetermined event is triggered.

Based on the above technical solution, the image collecting module 410 is configured to determine a current speaking user and determine the current speaking user as the target user when the at least one user interacts based on a real-time interactive interface; and collect the facial image to be processed of the target user based on the camera module.

Based on the above technical solution, the real-time interactive interface comprises a voice broadcast interactive interface, a video LIVE interactive interface, or a group chat interactive interface.

Based on the above technical solution, the image processing module 420 is configured to determine whether a line-of-sight feature in the facial image to be processed matches a predetermined line-of-sight feature based on a feature detection module; and if the line-of-sight feature in the facial image to be processed does not match the predetermined line-of-sight feature, process the facial image to be processed based on the target line-of-sight angle adjustment model to obtain the target facial image.

Based on the above technical solution, the image processing module 420 is configured to input the facial image to be processed into the target line-of-sight angle adjustment model to obtain the target facial image; where the line-of-sight angle in the target facial image is different from the line-of-sight angle in the image to be processed.

Based on the above technical solution, the image display module 430 is configured to send a multimedia data stream corresponding to the target facial image to the at least one client associated with the target user for display.

Based on the above technical solution, the apparatus further comprises: a model training module configured to obtain a training sample set, wherein the training sample set comprises a plurality of training samples, each of the training samples comprises a target line-of-sight angle image and a non-target line-of-sight angle image, and the training samples are determined based on a pre-trained target sample generation model; for each training sample, input the non-target line-of-sight angle image in the current training sample into a line-of-sight angle adjustment model to be trained, and obtain an actual output image corresponding to the current training sample; determine a loss value according to the target line-of-sight angle image and the actual output image of the current training sample, and adjust model parameters of the line-of-sight angle adjustment model to be trained based on the loss value and a predetermined loss function of the line-of-sight angle adjustment model to be trained; and determine convergence of the predetermined loss function of the line-of-sight angle adjustment model to be trained as a training target to obtain the target line-of-sight angle adjustment mode.

Based on the above technical solution, the apparatus further comprises a sample model generation module configured to obtain a non-target line-of-sight angle image generation sub-model in the target sample generation model by training in the following manner: inputting a pre-collected Gaussian distribution vector and an original non-frontal sample image into a non-target line-of-sight angle image generation sub-model to be trained to obtain an error value; correcting model parameters in the non-target line-of-sight angle image generation sub-model to be trained based on the error value and a loss function in the non-target line-of-sight angle image generation sub-model to be trained; and determining the convergence of the loss function of the non-target line-of-sight angle image generation sub-model to be trained as a training target to obtain the non-target line-of-sight angle image generation sub-model, so as to generate the non-target line-of-sight angle image in the training sample based on the non-target line-of-sight angle image generation sub-model.

Based on the above technical solution, the sample model generation module is configured to input the pre-collected Gaussian distribution vector and the original non-frontal sample image into the non-target line-of-sight angle image generation sub-model to be trained in the following way to obtain the error value: processing the Gaussian distribution vector based on a generator in the non-target line-of-sight angle image generation sub-model to be trained to obtain an image to be compared; and processing the original non-frontal sample image and the image to be compared based on a discriminator in the non-target line-of-sight angle image generation sub-model to be trained to obtain the error value.

Based on the above technical solution, the sample model generation module is further configured to obtain a non-target line-of-sight angle image generation sub-model in the target sample generation model by training in the following manner: obtaining model parameters in the non-target line-of-sight angle image generation sub-model, and reusing the model parameters in a target line-of-sight angle image generation sub-model to be trained; and training the target line-of-sight angle image generation sub-model to be trained based on the pre-collected Gaussian distribution vector and the original frontal sample image to obtain the target line-of-sight angle image generation sub-model, so as to generate the target line-of-sight angle image in the training sample based on the target line-of-sight angle image generation sub-model.

According to the technical solution of the embodiment of the present disclosure, when the facial image to be processed of the target user is collected, the facial image to be processed is processed based on the pre-trained target line-of-sight angle adjustment model, the line-of-sight of the user in the facial image to be processed is focused to the target line-of-sight angle and the target facial image with line-of-sight angle focused to the target line-of-sight angle is displayed to other clients, thereby solving the problem in the art that the line-of-sight is shifted or the line-of-sight is not focused when performing voice broadcasting based on teleprompter, resulting in poor interaction effect, and realizing the technical effect that when the target user interacts with other users through the terminal, the line-of-sight of the user can be automatically focused to the target line-of-sight angle which is an angle at which the user is perpendicular with the camera apparatus on the terminal, thereby improving the interaction efficiency between the target user and other interactive users.

The line-of-sight angle adjustment apparatus provided in the present disclosure can perform the line-of-sight angle adjustment method provided in any embodiment of the present disclosure, and the device is provided with corresponding functional modules for performing the method and thus has corresponding effects of the method.

The plurality of units and modules comprised in the above apparatus are only divided according to functional logic, but are not limited to the above division, as long as the corresponding functions can be realized; in addition, the names of a plurality of functional units are only provided for the sake of mutual distinction but are not used to limit the scope of protection of the embodiments of the present disclosure.

Embodiment 5

Figure 6:
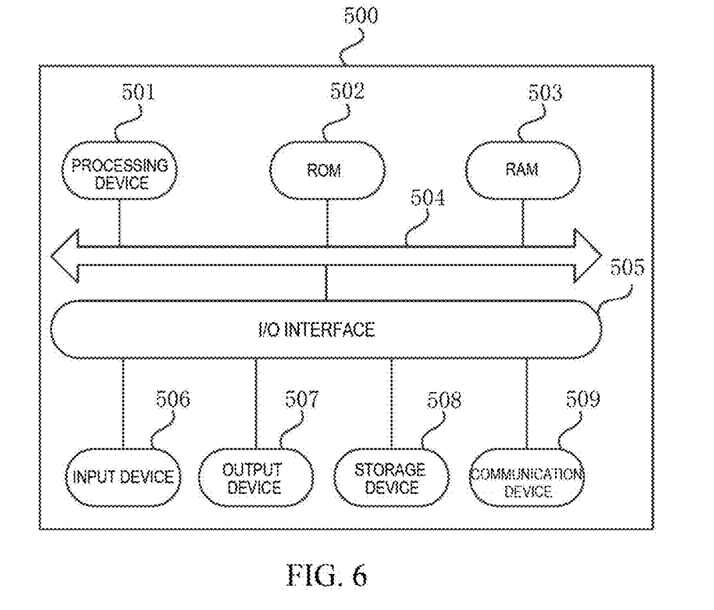
FIG. 6 is a structural schematic diagram illustrating an electronic device provided in embodiment 5 of the present disclosure.

FIG. 6 is a structural schematic diagram of an electronic device provided in an embodiment 5 of the present disclosure. Referring to FIG. 6 below, it shows a structural schematic diagram of an electronic device (such as the terminal device or server in FIG. 6) 500 suitable for implementing the embodiment of the present disclosure. The terminal device 500 in the embodiment of the present disclosure may comprise but is not limited to mobile terminals such as mobile phones, laptops, digital broadcast receivers, personal digital assistants (PDAs), tablet computers (PADs), portable multimedia players (PMPs), car-mounted terminals (such as car navigation terminals), etc. and fixed terminals such as digital televisions (TV), desktop computers, etc. The electronic device 500 shown in FIG. 6 is only an example and should not bring any limitation on the functionality and scope of use of the embodiment of the present disclosure.

As shown in FIG. 6, the electronic device 500 may comprise a processing apparatus (such as a central processing unit, graphics processing unit, etc.) 501, which may perform various appropriate actions and processes based on programs stored in Read-Only Memory (ROM) 502 or loaded from storage apparatus 508 into Random Access Memory (RAM) 503. In the RAM 503, various programs and data necessary for the operation of the electronic device 500 are also stored. The processing apparatus 501, ROM 502, and RAM 503 are connected to each other through a bus 504. An Input/Output I/O interface 505 is also connected to the bus 504.

Typically, the following apparatuses can be connected to I/O interface 505: input device 506 comprising, for example, touch screens, touchpads, keyboards, mice, cameras, microphones, accelerometers, gyroscopes, etc.; output device 507 comprising liquid crystal displays (LCDs), speakers, vibrators, etc.; storage device 506 comprising magnetic tapes, hard disks, etc.; and a communication device 509. The communication device 509 may allow the electronic device 500 to communicate with other apparatuses wirelessly or wirelessly to exchange data. Although FIG. 6 shows an electronic device 500 with a plurality of apparatuses, it is not required to implement or have all of the apparatuses shown. More or fewer apparatuses can be implemented or provided instead.

According to embodiments of the present disclosure, the process described above with reference to the flowchart can be implemented as a computer software program. For example, an embodiment of the present disclosure comprises a computer program product that comprises a computer program carried on a non-transitory computer-readable medium, where the computer program comprises program code for performing the method shown in the flowchart. In such an embodiment, the computer program can be downloaded and installed from a network through the communication apparatus 509, or installed from the storage apparatus 508, or installed from the ROM 502. When the computer program is executed by the processing apparatus 501, the above functions defined in the method of the embodiment of the present disclosure are performed.

The names of the messages or information exchanged between a plurality of apparatuses in the embodiment of the present disclosure are for illustrative purposes only and are not intended to limit the scope of these messages or information.

The electronic device provided in this embodiment of the present disclosure and the line-of-sight angle adjustment method provided in the above embodiments belongs to the same idea. Technical details that are not described in detail in this embodiment can be found in the above embodiments, and this embodiment has the same effect as the above embodiments.

Embodiment 6

The embodiment 6 of the present disclosure provides a computer storage medium on which a computer program is stored, when being executed by a processor, the program implements the line-of-sight angle adjustment method provided in the above embodiments.

The computer-readable storage medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Examples of computer-readable storage media may comprise but are not limited to: an electrical connection with one or more wires, a portable computer disk, a hard disk, RAM, ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can comprise a data signal propagated in baseband or as part of a carrier wave, which carries computer-readable program code therein. Such propagated data signals may take many forms, comprising but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, comprising but not limited to: wires, optical cables, radio frequency (RF), etc., or any suitable combination thereof.

In some embodiments, clients and servers can communicate using any currently known or future developed network protocol such as HyperText Transfer Protocol (HTTP), and can be interconnected with any form or medium of digital data communication (such as communication networks). Examples of communication networks comprise local area networks (LANs), wide area networks (WANs), internetworks (such as the Internet), and end-to-end networks (such as ad hoc end-to-end networks), as well as any currently known or future developed networks.

The above-mentioned computer-readable medium may be comprised in the above-mentioned electronic device, or it may exist independently without being assembled into the electronic device.

The above-mentioned computer-readable medium carries one or more programs, and when the above-mentioned one or more programs are executed by the electronic device, the electronic device: collect a facial image to be processed of a target user, process the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and display the target facial image to at least one client.

Computer program codes for performing the operations of the present disclosure may be written in one or more programming languages or a combination thereof, comprising but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—comprising LAN or WAN—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in the a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in one case, for example, the image display module may also be described as "a module for displaying the target facial image to at least one client".

The functions described herein above can be performed at least in part by one or more hardware logic components. For example, without limitation, exemplary types of hardware logic components that may be used comprise: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may comprise, but are not limited to, electronic, magnetic, optical, electromagnetic, infrared, or semiconductor systems, apparatuses, or devices, or any suitable combination thereof. Examples of the machine-readable storage medium may comprise electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, [Example 1] provides a line-of-sight angle adjustment method, which comprises:
  collecting a facial image to be processed of a target user,
  processing the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and
  displaying the target facial image to at least one client.

According to one or more embodiments of the present disclosure, [Example 2] provides a line-of-sight angle adjustment method, which comprises:
  the collecting a facial image to be processed of a target user comprises:
  when at least one user interacts based on a real-time interactive interface, collecting the facial image to be processed of the target user among the at least one user, or, when detecting that a predetermined event is triggered, collecting the facial image to be processed of the target user based on a camera module.

According to one or more embodiments of the present disclosure, [Example 3] provides a line-of-sight angle adjustment method, which comprises:
  the collecting the facial image to be processed of the target user among the at least one user when a plurality of users interact based on the real-time interactive interface comprises:
  when the at least one user interacts based on the real-time interactive interface, determining a current speaking user and determining the current speaking user as the target user, and
  collecting the facial image to be processed of the target user based on a camera module.

According to one or more embodiments of the present disclosure, [Example 4] provides a line-of-sight angle adjustment method, which comprises:
  the real-time interactive interface comprises a voice broadcast interactive interface, a video LIVE interactive interface or a group chat interactive interface.

According to one or more embodiments of the present disclosure, [Example 5] provides a line-of-sight angle adjustment method, which comprises:
  the target line-of-sight angle adjustment model is pre-trained, and before processing the facial image to be processed based on the target line-of-sight angle adjustment model to obtain the target facial image corresponding to the facial image to be processed, the method further comprises:
  based on a feature detection module, determining whether a line-of-sight feature in the facial image to be processed matches a predetermined line-of-sight feature; and
  in response to that the line-of-sight feature in the facial image to be processed does not match the predetermined line-of-sight feature, processing the facial image to be processed based on the target line-of-sight angle adjustment model to obtain the target facial image.

According to one or more embodiments of the present disclosure, [Example 6] provides a line-of-sight angle adjustment method, which comprises:
  the target facial image is processed based on the target line-of-sight angle adjustment model to obtain the target facial image comprises:
  inputting the facial image to be processed into the target line-of-sight angle adjustment model to obtain the target facial image; wherein the line-of-sight angle in the target facial image is different from the line-of-sight angle in the image to be processed.

According to one or more embodiments of the present disclosure, [Example 7] provides a line-of-sight angle adjustment method, which comprises:
  the displaying the target facial image to at least one client comprises:
  sending a multimedia data stream corresponding to the target facial image to the at least one client associated with the target user for display.

According to one or more embodiments of the present disclosure, [Example 8] provides a line-of-sight angle adjustment method, which comprises:

obtaining a training sample set, wherein the training sample set comprises a plurality of training samples, each of the training samples comprises a target line-of-sight angle image and a non-target line-of-sight angle image, and the training samples are determined based on a pre-trained target sample generation model;

for each training sample, inputting the non-target line-of-sight angle image in the current training sample into a line-of-sight angle adjustment model to be trained, and obtaining an actual output image corresponding to the current training sample;

determining a loss value according to the target line-of-sight angle image and the actual output image of the current training sample, and adjusting model parameters of the line-of-sight angle adjustment model to be trained based on the loss value and a predetermined loss function of the line-of-sight angle adjustment model to be trained; and determining convergence of the predetermined loss function of the line-of-sight angle adjustment model to be trained as a training target to obtain the target line-of-sight angle adjustment model.

According to one or more embodiments of the present disclosure, [Example 9] provides a line-of-sight angle adjustment method, which comprises:

obtaining a non-target line-of-sight angle image generation sub-model in the target sample generation model by training comprises:

inputting a pre-collected Gaussian distribution vector and an original non-frontal sample image into a non-target line-of-sight angle image generation sub-model to be trained to obtain an error value;

correcting model parameters in the non-target line-of-sight angle image generation sub-model to be trained based on the error value and a loss function in the non-target line-of-sight angle image generation sub-model to be trained; and determining convergence of the loss function of the non-target line-of-sight angle image generation sub-model to be trained as a training target to obtain the non-target line-of-sight angle image generation sub-model, so as to generate the non-target line-of-sight angle image in the training sample based on the non-target line-of-sight angle image generation sub-model.

According to one or more embodiments of the present disclosure, [Example 10] provides a line-of-sight angle adjustment method, which comprises:

the inputting a pre-collected Gaussian distribution vector and an original non-frontal sample image into a non-target line-of-sight angle image generation sub-model to be trained to obtain an error value comprises:

processing the Gaussian distribution vector based on a generator in the non-target line-of-sight angle image generation sub-model to be trained to obtain an image to be compared; and processing the original non-frontal sample image and the image to be compared based on a discriminator in the non-target line-of-sight angle image generation sub-model to be trained to obtain the error value.

According to one or more embodiments of the present disclosure, [Example 11] provides a line-of-sight angle adjustment method, which comprises:

obtaining a target line-of-sight angle image generation sub-model in the target sample generation model by training comprising:

obtaining model parameters in the non-target line-of-sight angle image generation sub-model, and reusing the model parameters in a target line-of-sight angle image generation sub-model to be trained; and training the target line-of-sight angle image generation sub-model to be trained based on the pre-collected Gaussian distribution vector and the original frontal sample image to obtain the target line-of-sight angle image generation sub-model, so as to generate the target line-of-sight angle image in the training sample based on the target line-of-sight angle image generation sub-model.

According to one or more embodiments of the present disclosure, [Example 12] provides a line-of-sight angle adjustment method, which comprises:

inputting a plurality of Gaussian distribution vectors to the target line-of-sight angle image generation sub-model and the non-target line-of-sight angle image generation sub-model respectively, to obtain a frontal line-of-sight sample image and a non-frontal line-of-sight sample image in the training sample.

According to one or more embodiments of the present disclosure, [Example 13] provides a line-of-sight angle adjustment device, which comprises:

an image collecting module configured to collect a facial image to be processed of a target user, an image processing module configured to process the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and an image display module configured to display the target facial image to at least one client.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although multiple implementation details are comprised in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

I claim:

1. A method for line-of-sight angle adjustment, comprising:
   collecting a facial image to be processed of a target user;
   processing the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and
   displaying the target facial image to at least one client,
   wherein the target line-of-sight angle adjustment model is pre-trained, and before processing the facial image to be processed based on the target line-of-sight angle adjustment model to obtain the target facial image corresponding to the facial image to be processed, the method further comprises:
   based on a feature detection module, determining whether a line-of-sight feature in the facial image to be processed matches a predetermined line-of-sight feature; and
   in response to that the line-of-sight feature in the facial image to be processed does not match the predetermined line-of-sight feature, processing the facial image to be processed based on the target line-of-sight angle adjustment model to obtain the target facial image.

2. The method of claim 1, wherein the collecting a facial image to be processed of a target user comprises:
   when at least one user interacts based on a real-time interactive interface, collecting the facial image to be processed of the target user among the at least one user; or,
   when detecting that a predetermined event is triggered, collecting the facial image to be processed of the target user based on a camera module.

3. The method of claim 2, wherein the least one user comprises a plurality of users, and wherein the collecting the facial image to be processed of the target user among the at least one user comprises:
   when the at least one user interacts based on the real-time interactive interface, determining a current speaking user and determining the current speaking user as the target user; and
   collecting the facial image to be processed of the target user based on a camera module.

4. The method of claim 1, wherein the processing the facial image to be processed based on the target line-of-sight angle adjustment model to obtain the target facial image comprises:
   inputting the facial image to be processed into the target line-of-sight angle adjustment model to obtain the target facial image; wherein the line-of-sight angle in the target facial image is different from the line-of-sight angle in the image to be processed.

5. The method of claim 1, wherein the displaying the target facial image to at least one client comprises:
   sending a multimedia data stream corresponding to the target facial image to the at least one client associated with the target user for display.

6. The method of claim 1, further comprising:
   obtaining a training sample set, wherein the training sample set comprises a plurality of training samples, each of the training samples comprises a target line-of-sight angle image and a non-target line-of-sight angle image, and the training samples are determined based on a pre-trained target sample generation model;
   for each training sample, inputting the non-target line-of-sight angle image in a current training sample into a line-of-sight angle adjustment model to be trained, and obtaining an actual output image corresponding to the current training sample;
   determining a loss value according to the target line-of-sight angle image and the actual output image of the current training sample, and adjusting model parameters of the line-of-sight angle adjustment model to be trained based on the loss value and a predetermined loss function of the line-of-sight angle adjustment model to be trained; and
   determining convergence of the predetermined loss function of the line-of-sight angle adjustment model to be trained as a training target to obtain the target line-of-sight angle adjustment model.

7. The method of claim 6, further comprising:
   obtaining a non-target line-of-sight angle image generation sub-model in the target sample generation model by training, comprising:
   inputting a pre-collected Gaussian distribution vector and an original non-frontal sample image into a non-target line-of-sight angle image generation sub-model to be trained to obtain an error value;
   correcting model parameters in the non-target line-of-sight angle image generation sub-model to be trained based on the error value and a loss function in the non-target line-of-sight angle image generation sub-model to be trained; and
   determining convergence of the loss function of the non-target line-of-sight angle image generation sub-model to be trained as a training target to obtain the non-target line-of-sight angle image generation sub-model, so as to generate the non-target line-of-sight angle image in the training sample based on the non-target line-of-sight angle image generation sub-model.

8. The method of claim 7, wherein the inputting a pre-collected Gaussian distribution vector and an original non-frontal sample image into a non-target line-of-sight angle image generation sub-model to be trained to obtain an error value comprises:
   processing the Gaussian distribution vector based on a generator in the non-target line-of-sight angle image generation sub-model to be trained to obtain an image to be compared; and
   processing the original non-frontal sample image and the image to be compared based on a discriminator in the non-target line-of-sight angle image generation sub-model to be trained to obtain the error value.

9. The method of claim 7, wherein obtaining a target line-of-sight angle image generation sub-model in the target sample generation model by training comprises:
   obtaining model parameters in the non-target line-of-sight angle image generation sub-model, and reusing the model parameters in the target line-of-sight angle image generation sub-model to be trained; and
   training the target line-of-sight angle image generation sub-model to be trained based on the pre-collected Gaussian distribution vector and an original frontal sample image to obtain the target line-of-sight angle image generation sub-model, so as to generate the target line-of-sight angle image in the training sample based on the target line-of-sight angle image generation sub-model.

10. An electronic device, comprising:
at least one processor;
a storage means configured to store at least one program;
when the at least one program is executed by the at least one processor, the at least one processor perform acts comprising:
collecting a facial image to be processed of a target user;
processing the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and
displaying the target facial image to at least one client,
wherein the target line-of-sight angle adjustment model is pre-trained, and before processing the facial image to be processed based on the target line-of-sight angle adjustment model to obtain the target facial image corresponding to the facial image to be processed, the method further comprises:
based on a feature detection module, determining whether a line-of-sight feature in the facial image to be processed matches a predetermined line-of-sight feature; and
in response to that the line-of-sight feature in the facial image to be processed does not match the predetermined line-of-sight feature, processing the facial image to be processed based on the target line-of-sight angle adjustment model to obtain the target facial image.

11. The electronic device of claim 10, wherein the collecting a facial image to be processed of a target user comprises:
when at least one user interacts based on a real-time interactive interface, collecting the facial image to be processed of the target user among the at least one user; or,
when detecting that a predetermined event is triggered, collecting the facial image to be processed of the target user based on a camera module.

12. The electronic device of claim 11, wherein the least one user comprises a plurality of users, and wherein the collecting the facial image to be processed of the target user among the at least one user comprises:
when the at least one user interacts based on the real-time interactive interface, determining a current speaking user and determining the current speaking user as the target user; and
collecting the facial image to be processed of the target user based on a camera module.

13. The electronic device of claim 10, wherein the processing the facial image to be processed based on the target line-of-sight angle adjustment model to obtain the target facial image comprises:
inputting the facial image to be processed into the target line-of-sight angle adjustment model to obtain the target facial image; wherein the line-of-sight angle in the target facial image is different from the line-of-sight angle in the image to be processed.

14. The electronic device of claim 10, wherein the displaying the target facial image to at least one client comprises:

sending a multimedia data stream corresponding to the target facial image to the at least one client associated with the target user for display.

15. The electronic device of claim 10, wherein the acts further comprising:
obtaining a training sample set, wherein the training sample set comprises a plurality of training samples, each of the training samples comprises a target line-of-sight angle image and a non-target line-of-sight angle image, and the training samples are determined based on a pre-trained target sample generation model;
for each training sample, inputting the non-target line-of-sight angle image in a current training sample into a line-of-sight angle adjustment model to be trained, and obtaining an actual output image corresponding to the current training sample;
determining a loss value according to the target line-of-sight angle image and the actual output image of the current training sample, and adjusting model parameters of the line-of-sight angle adjustment model to be trained based on the loss value and a predetermined loss function of the line-of-sight angle adjustment model to be trained; and
determining convergence of the predetermined loss function of the line-of-sight angle adjustment model to be trained as a training target to obtain the target line-of-sight angle adjustment model.

16. The electronic device of claim 15, wherein the acts further comprising:
obtaining a non-target line-of-sight angle image generation sub-model in the target sample generation model by training, comprising:
inputting a pre-collected Gaussian distribution vector and an original non-frontal sample image into a non-target line-of-sight angle image generation sub-model to be trained to obtain an error value;
correcting model parameters in the non-target line-of-sight angle image generation sub-model to be trained based on the error value and a loss function in the non-target line-of-sight angle image generation sub-model to be trained; and
determining convergence of the loss function of the non-target line-of-sight angle image generation sub-model to be trained as a training target to obtain the non-target line-of-sight angle image generation sub-model, so as to generate the non-target line-of-sight angle image in the training sample based on the non-target line-of-sight angle image generation sub-model.

17. The electronic device of claim 16, wherein the inputting a pre-collected Gaussian distribution vector and an original non-frontal sample image into a non-target line-of-sight angle image generation sub-model to be trained to obtain an error value comprises:
processing the Gaussian distribution vector based on a generator in the non-target line-of-sight angle image generation sub-model to be trained to obtain an image to be compared; and
processing the original non-frontal sample image and the image to be compared based on a discriminator in the non-target line-of-sight angle image generation sub-model to be trained to obtain the error value.

18. A non-transitory storage medium comprising computer-executable instructions stored thereon, the computer-executable instructions, when executed by a processor, causing an electronic device to perform acts comprising:

collecting a facial image to be processed of a target user;

processing the facial image to be processed based on a target line-of-sight angle adjustment model to obtain a target facial image corresponding to the facial image to be processed; wherein the target line-of-sight angle adjustment model is configured to adjust the line-of-sight angle of a user in a facial image to a target angle; and displaying the target facial image to at least one client, wherein the target line-of-sight angle adjustment model is pre-trained, and before processing the facial image to be processed based on the target line-of-sight angle adjustment model to obtain the target facial image corresponding to the facial image to be processed, the method further comprises:

based on a feature detection module, determining whether a line-of-sight feature in the facial image to be processed matches a predetermined line-of-sight feature; and in response to that the line-of-sight feature in the facial image to be processed does not match the predetermined line-of-sight feature, processing the facial image to be processed based on the target line-of-sight angle adjustment model to obtain the target facial image.

* * * * *